United States Patent [19]
Bean

[11] 3,884,686
[45] May 20, 1975

[54] COLOR CORRECTION METHOD

[75] Inventor: Lloyd F. Bean, Rochester, N.Y.

[73] Assignee: Xerox Corporation, Stamford, Conn.

[22] Filed: Oct. 26, 1973

[21] Appl. No.: 409,978

Related U.S. Application Data

[63] Continuation-in-part of Ser. No. 213,088, Dec. 28, 1971, abandoned.

[52] U.S. Cl. ........................ 96/1.4; 96/1.2
[51] Int. Cl. ........................ G03g 13/22
[58] Field of Search ............ 96/1.2, 5, 6, 23, 1.4; 355/4

[56] References Cited

UNITED STATES PATENTS

| | | | |
|---|---|---|---|
| 2,986,466 | 5/1961 | Kaprelian | 96/1.2 |
| 3,043,686 | 7/1962 | Bickmore | 96/1.2 |
| 3,057,720 | 10/1962 | Hayford | 96/1.2 |
| 3,420,662 | 1/1969 | Meyer et al | 96/5 X |
| 3,615,391 | 10/1971 | Honto et al | 96/1.2 |
| 3,692,519 | 9/1972 | Takahashi | 96/1.2 |

*Primary Examiner*—Roland E. Martin, Jr.
*Attorney, Agent, or Firm*—James J. Ralabate; David C. Petre; Sang K. Lee

[57] ABSTRACT

This invention relates to a color correction method in a xerographic process in which the free surface of a xerographic plate having an insulating overlayer is charged a first time and exposed imagewise through a first primary color filter, then charged a second time and exposed imagewise through a second primary color filter. After the second exposure, the plate is recharged and subject to a flood light to form a latent electrostatic color image. The latent image is developed by depositing on the plate an electrostatically attractable toner having a color which complements the color of the second primary color filter. The foregoing steps are repeated for all of the primary color toners to produce high fidelity facsimile color copies. The present method may be used for color copies or color separations of color originals.

23 Claims, 25 Drawing Figures

COLOR CORRECTION METHOD

This is a continuation-in-part application of a co-pending application Ser. No. 213,088 filed on Dec. 28, 1971, now abandoned.

This invention relates to xerography in general and, in particular, to an improved method of color correction in the art of xerographic color reproduction and using the method in making color copies or color separations of color originals.

BACKGROUND OF THE INVENTION

Conventionally in the xerographic process, as disclosed in U.S. Pat. No. 2,297,691 to Carlson, a uniform electrostatic charge is placed on a photoconductive insulating surface of a xerographic plate in darkness by a charging mechanism such as a corotron. Subsequently, parts of the surface of the photoconductive layer of the plate are discharged by imagewise exposure to light or to actinic radiation. Areas not exposed to light continue to act as insulators and, therefore, retain their static charges. The electrostatic latent image formed on the xerographic plate is then developed by depositing an electrostatically attractable developer or toner. The developed toner image is then transferred and heat fused onto a copy paper.

The xerographic process of Carlson has been extended to methods of producing color copies, as described, for example, in U.S Pat. Nos. 2,962,374 and 2,962,375 to John H. Dessauer and Roland M. Schaffert, respectively. The xerographic color processes as taught by these patents are generally based on the color subtraction principle which involves the steps of developing with the primary colorants, cyan, magenta and yellow, the latent images formed on the xerographic plate after it is exposed imagewise to a white light through a primary color filter. While the methods described therein are satisfactory, they can be improved upon.

BRIEF DESCRIPTION OF THE INVENTION

Accordingly, one object of the present invention is to provide an improved method of producing high fidelity color copier.

Another object of the present invention is to provide an improved method of balancing the colors in xerographic color processes.

Still another object of the present invention is to provide an improved method of color correction in xerographic color copying processes.

Still another object of the present invention is to utilize the present method in separating colors of a color original.

Still further objects of the present invention is to utilize the present inventive method in making xeroprinting, lithographic or color separation masters.

These and other objects of the present invention are achieved by a process involving a combination of steps as described below that result in an improved fidelity of color copies using a xerographic plate of the type having a substrate, a photoconductor layer and a transparent insulating overlayer. For the detailed description of the structure of the plate, one may refer to a co-pending continuation application Ser. No. 410,725 filed Oct. 29, 1973, which is based on a parent application Ser. No. 213,022, filed on Dec. 28, 1971, now abandoned. The present method comprises the steps of charging the plate, exposing it imagewise through a primary color for effecting the color correction. These steps may be repeated with other primary color filters if further correction is required. After these corrective steps, the plate is again charged but in the opposite polarity and exposed imagewise through a filter of another primary color that complements the primary colorant which will be used to develop the resulting latent electrostatic image.

The preliminary steps of charging and imagewise exposing through different color filters are designed to take care of the non-ideal characteristics of the colorants used to produce color copies. Usually, the commercially available subtractive primary colorants, yellow, magenta and cyan, not only absorb their complementing primary colors blue, green and red respectively, but also other primary colors though to lesser extents. These preliminary steps are used to compensate for the undesired color absorption of the colorants because non-ideal characteristics; that is, each of the exposure steps through a color filter stores at the photoconductor-insulator interface a charge pattern representing a portion of tonal information of the color original and thereby condition the plate to compensate for the complementary color distortion of the primary color.

These steps are repeated, where necessary with filters of different colors in arriving at a composite of a charge pattern to compensate for the color distortions of subtractive primary colors. Thus, for example, in obtaining a latent electrostatic image pattern of yellow portion of a color original the plate is first charged and exposed through a green filter and charged and exposed through a red filter to compensate for the non-ideal color characteristics of magenta and cyan. Then the plate is charged and imagewise exposed through blue filter which gives the yellow color image pattern. Thus, preliminary exposure and imagewise exposure through filter may be repeated with different color filters depending upon the color characteristics. Thus, while in the case of yellow, the steps may be repeated with green and red filters preferably because of the fact that cyan and magenta also have optical density in blue region, this is not the case for all primary colorants. Thus, for example, in the case of cyan the magenta and yellow does not have much of optical density. Hence, in making a cyan image, the preliminary steps of charging the plate and imagewise exposing it through blue filter and then charging it and imagewise exposing it through the green filter could be eliminated and go directly to charging and imagewise exposing it through a red filter which complements the cyan color.

After the foregoing steps, the plate is charged and flood exposed to form a latent electrostatic image on the plate. It is believed that the flood exposure has the effect of relaxing the electric field within the photoconductive layer and to cause all of the individual electrostatic charge pattern after each imagewise exposure step to store cumulatively at the photoconductor-insulating interface. For a detailed description of the operational processes to take place in the xerographic plate is described in detail in the aforementioned co-pending application Ser. No. 410,725.

The latent electrostatic image is then developed with the primary colorant which complements the color of the final filter. These steps are repeated in all of the primary colorants, magenta, cyan, and yellow to produce high fidelity facsimile color copies.

Another feature of the present invention is to repeat the steps of charging and imagewise exposing through each of the primary color filters with decreasing amount of exposure for extending the brightness acceptance range and tonal contrast of the xerographic plate as described in the above mentioned copending application Ser. No. 410,725 filed Oct. 29, 1973.

Still another feature of the present invention is in the use of the present method in separating the colors of a color original.

A further feature of the present invention is in the use of the present method in making color copies.

Another feature of the present invention is in the use of the present method in making xeroprinting lithographic or color separation masters.

The foregoing and other objects and features of the present invention will be more clearly understood from the following detailed description of the present invention in conjunction with the accompanying drawings in which:

FIGS. 4A through 6C show the optical density for increasing amounts of the primary color pigments as measured through different color filters.

DETAILED DESCRIPTION OF THE INVENTION

Figure 1:
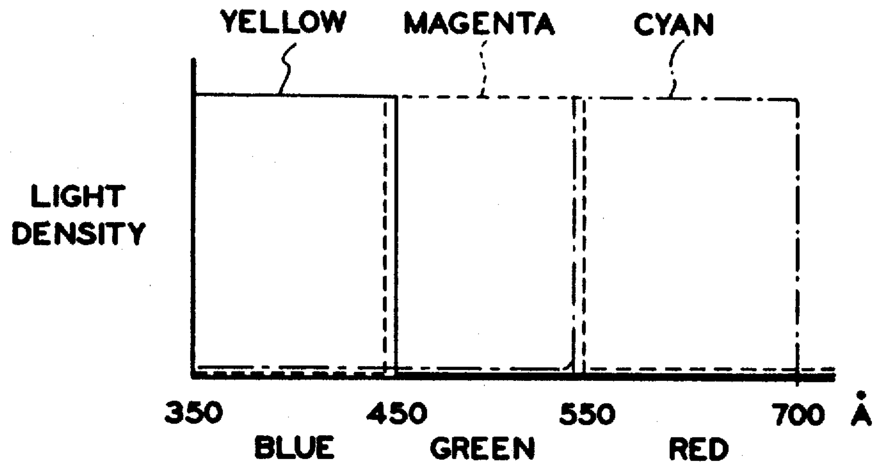
FIG. 1 shows optical density versus wavelength curves for the idealized primary colors.
Figure 2:
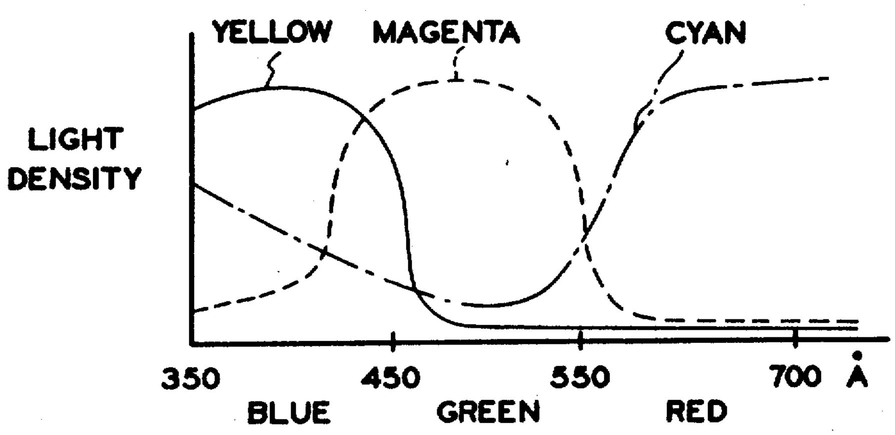
FIG. 2 shows the density versus the wavelength curves for the generally available primary colorants.

In general, the human eye is equipped with three different kinds of light detectors: one for detecting short wave lengths to see blue, another for medium wave lengths to see green, and a third for long wave lengths to see red. White light is a mixture of all of these wave lengths or in other words a mixture of red, green and blue light. Any color can be made from a suitable mixture of the three subtractive primary colorants, which may be in the form of inks, pigments, dyes, etc. In the xerographic color processes the three subtractive primary colorants, cyan, magenta, and yellow color toners are used to subtract the red, green, and blue respectively from the white light. Thus, where an original reflects little or no red, a cyan colorant is used to absorb the red light; where it reflects little or no green, a magenta colorant is used to absorb the green light; and, where it reflects little or no blue, yellow colorant is used to absorb the blue light. If the primary colorants were ideal, as shown by the light density versus wavelengths curves for idealized primary colors in FIG. 1, the color xerographic process would be rather simple, but they are not. Thus, as shown in FIG. 2, whereas, the yellow colorant comes close to the ideal in that it reflects its complementary colors green and red, reasonably well, in contrast, the cyan and magenta are rather far from the ideal in that magenta reflects blue rather poorly and cyan reflects green and blue rather poorly. These less than ideal characteristics may be summarized as in the following tabulation;

| Color | Should Reflect | How Well | Should Reflect | How Well |
|---|---|---|---|---|
| Yellow | Red | Well | Green | Well |
| Magenta | Red | Well | Blue | Very poor |
| Cyan | Green | Poor | Blue | Poor |

The less than ideal characteristics of the available colorants necessitate color correction.

In accordance with the present invention, in general, the color correction is achieved by introducing certain preliminary steps: They include the steps of charging and exposing imagewise the xerographic plate with a filter of a primary color before it is charged and exposed imagewise through a filter of another primary color which complements the color of the subtractive primary colorant. These steps are so controlled that they compensate for the less than ideal color characteristics of the substractive primary colorants. Properly effected as described in detail below, the preliminary steps result in a formation of a color image having a density distribution which approximates the tonal range and color of the original.

Figure 3A:
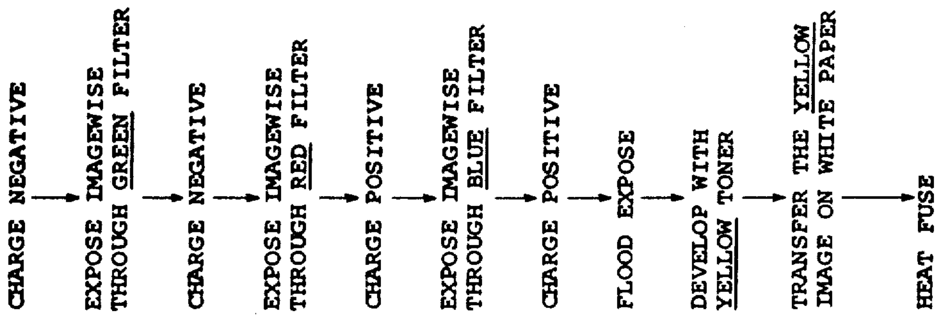
FIGS. 3A, 3B and 3C show flow charts of the steps in the xerographic color processes in accordance with the invention.
Figure 3B:
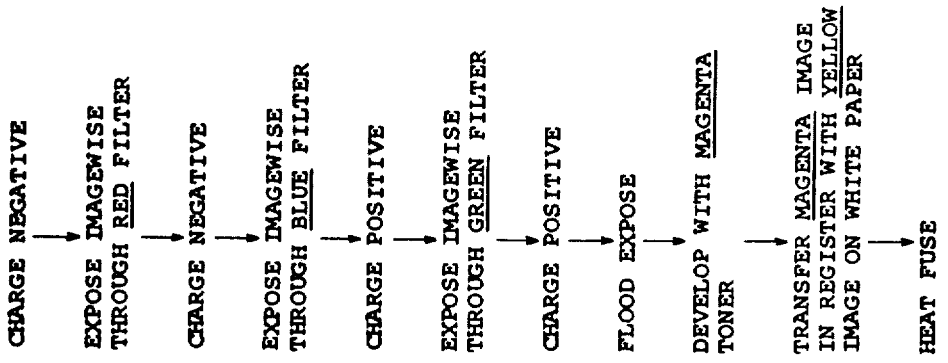
Figure 3C:
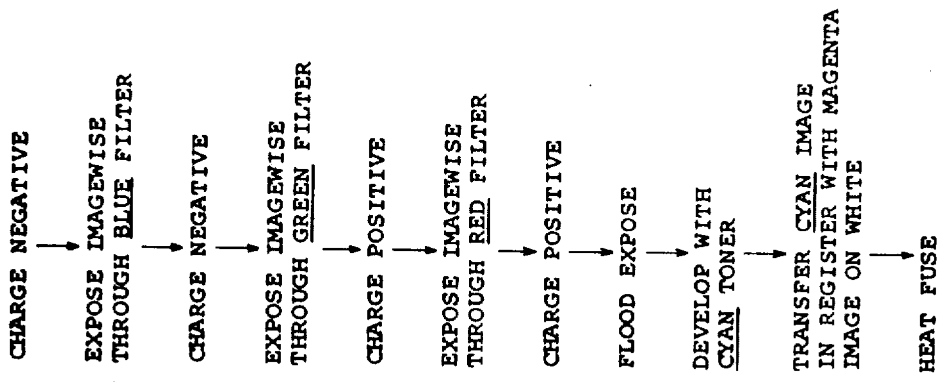

In particular, referring to FIGS. 3A, 3B and 3C of the drawings, the present invention comprises the following steps. As shown in FIG. 3A, to copy the yellow color portion of the original, the xerographic plate is first negatively charged and imagewise exposed through a green filter. If a high quality color copy is desired, the xerographic plate is charged negatively again and exposed through a red filter at a predetermined exposure level. Thereafter, the xerographic plate is charged positively and imagewise exposed through a blue filter. These steps result in the formation of a charge pattern having charge densities on the xerographic plate which represents the blue filter densities found in the original or the amount of the yellow colorant needed to reproduce the original.

The xerographic plate is then positively charged again and flood exposed in the manner described in the above-mentioned copending application to form a latent electrostatic image on the xerographic plate. The latent electrostatic image is then developed by a yellow toner and transferred to a white copy sheet and may then be fixed to the sheet permanently.

A magenta color contents of the original is copied in a similar manner by subjecting the xerographic plate to a negative charge and imagewise exposure through a red filter, and again a negative charge and imagewise exposure through a blue filter to condition the plate before it is subjected to a positive charge and imagewise exposure through a green filter and positive charge and flood exposure to form a latent image. Thereafter, a magenta toner is applied in the manner stated above to reproduce the green filter densities of the original or the amount of the magenta color required to reproduce the original and transferred to the copy sheet in register with the yellow cclor image and may then be fixed to the sheet.

Similarly, the cyan color content of the original is copied by repeating the aforementioned steps with blue, green and red filters as set forth in FIG. 3C, followed by the development of the latent image using a cyan toner which is then transferred to the copy sheet in register with the yellow magenta images, and fixed thereto.

Note that in the case of making a cyan image, one may advantageously take into account the fact that the optical density characteristics of the yellow and magenta are such that they interface least with that of cyan as shown in FIG. 2. Hence, the preliminary steps of charging and exposing the plate with blue and green filter respectively, may be eliminated without affecting the cyan color copy quality too badly.

The composite of the cyan, magenta, and yellow color toners applied to the copy paper in accordance with the foregoing manner produces high fidelity facsimile color copies. While in the above example, the primary color images may be fixed to the copy sheet after each transfer, it need not be so limited. Instead the transfer toner images of the primary colorants in succeeding cycles may be deposited in register with that of the preceding cycle.

The composite of the toners may then be fixed in a conventional manner to produce a smudge free permanent copy. In accordance with the invention, in short, the degree of fidelity of the color copy is controlled by adding the aforementioned preliminary steps in forming a latent electrostatic image and then developing it with suitable amounts of primary color pigments or toners.

The present invention may be more clearly understood from the effects that various steps of the aforementioned processes have on the charge density and free surface potential of the xerographic plate, as described below in conjunction with FIGS. 4 through 13.

Figure 7:
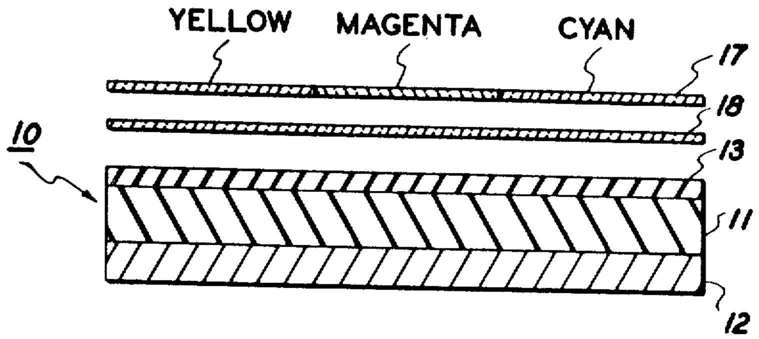
FIGS. 7 through 13 show the plate potential and the charge density patterns of the photoconductor-insulating layer interface of the xerographic plate after it has been subjected to the various steps in the color xerographic processes.

A xerographic plate 10 suitable for use with the present method may include as shown in FIG. 7, a xerographic plate 10 having a photoconductive layer 11 sandwiched between a conductive substrate layer 12 and an optically transparent insulating layer 13.

Figures 4A, 4B, 4C, 5A, 5B, 5C, 6A, 6B, 6C:
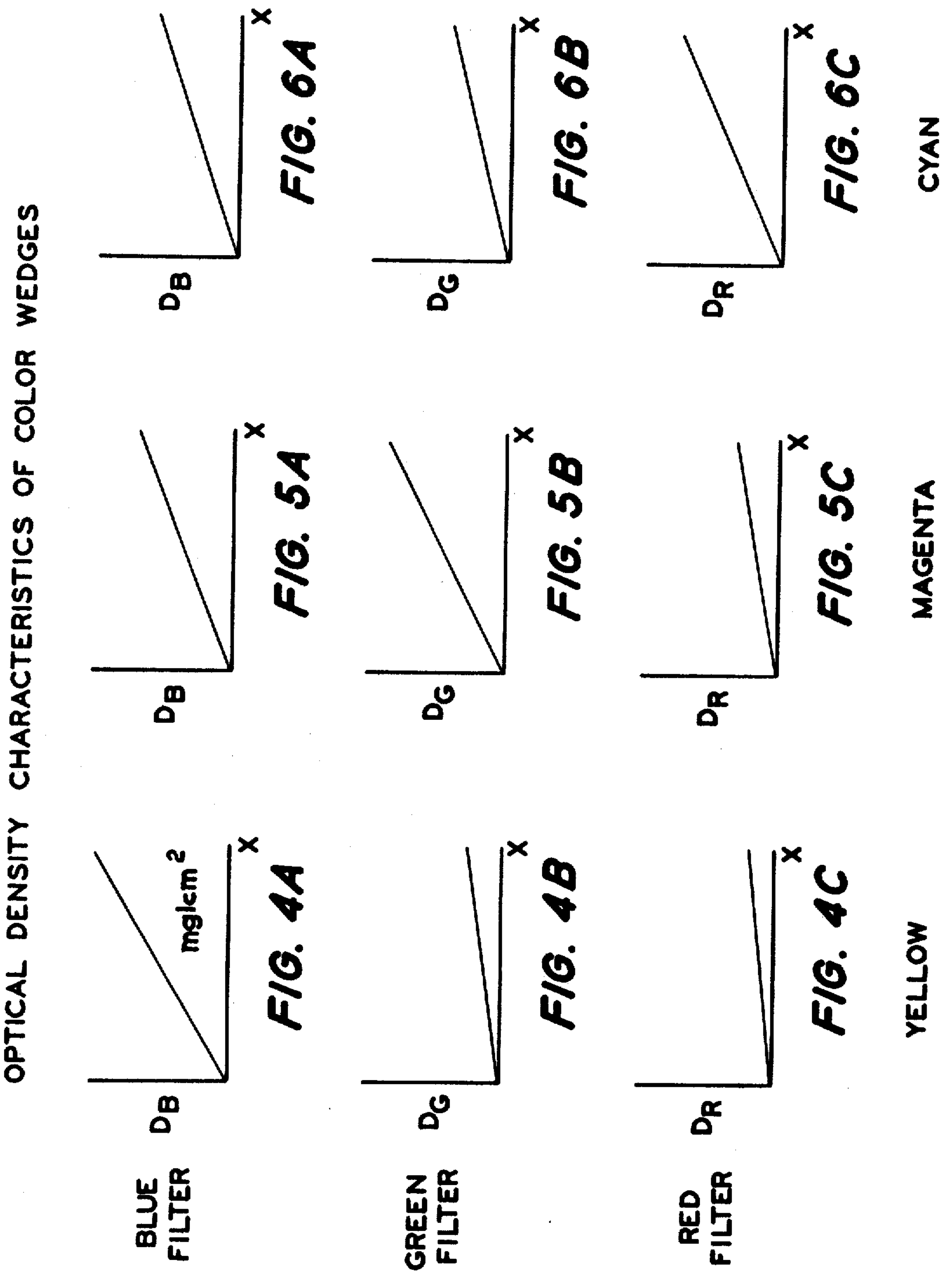

FIGS. 4, 5 and 6 show the optical densities versus length of a usual set of color density wedges readily available from companies, such as Kodak Company, Inc., yellow, magenta and cyan, as viewed through blue, green and red filters, respectively. This is represented in the tabulation shown above. The blue filter exposure should represent only the yellow content of an original; however, as shown in FIGS. 4A, 5A and 6A, yellow will be deposited in both the magenta and cyan color areas because of their absorption of blue light. The following procedure will compensate for the unwanted absorptions of the magenta and cyan.

Figure 8A:
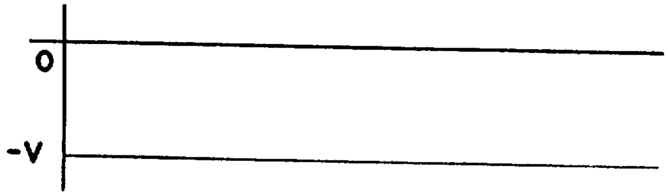
Figure 8B:
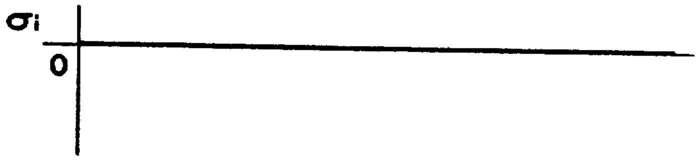

The Xerographic plate is first charged negatively by grounding the conductive substrate layer 12 and spraying negative corona on the surface of the insulating layer 13. The negative charges deposited on the surface of the insulating layer 13 induce an equal number of positive charge in conductive layer 12. The charging step forms a uniform negative surface potential ($-v$) as shown in FIG. 8A. The negative charges induced in the insulating layer induces a positive charge in the substrate conductor layer 12 but does not induce any charge at the insulator photoconductor insulator interface as shown in FIG. 8B. As shown, the charge density is essentially zero.

Figure 9A:
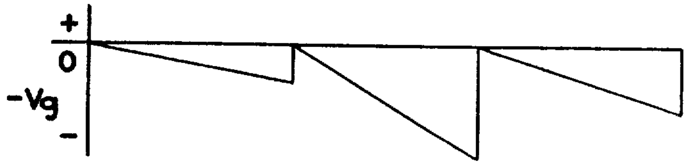
Figure 9B:
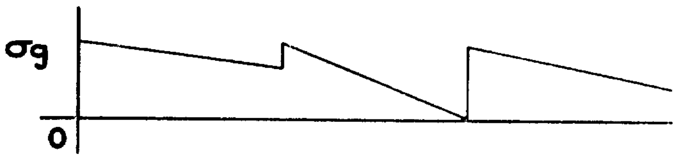

After the exposure of the plate to the original 17 through a green filter 18, a free surface potential pattern on the negatively charged surface is formed as shown in FIG. 9A. This causes the migration of a pattern of positive charges $+\sigma g$, as shown in FIG. 9B, to the interface between the photoconductive layer 11 and insulating layer 13 in accordance with the green filter optical densities shown in FIGS. 4B, 5B and 6B.

It is believed that the foregoing takes place as a result of the electron-hole recombination and migration of holes as follows. Upon exposure, electrons of the electron hole pairs generated in the photoconductor, migrate to the conductive layer and neutralize the positive charges induced in the conductive layer in the charging step while the holes migrate to the photoconductive-insulator interface and are trapped there. These holes form a charge pattern $\sigma g$ at the interface as shown in FIG. 9B.

Referring to the FIGS. 4B, 5B and 6B yellow, magenta and cyan have lower and higher and lower optical densities, respectively, when measured through a green color filter; that is, yellow color spectrum goes through a green filter by a large amount and so does cyan (red) whereas the magenta (green) color goes through by a small amount. The fact that the optical density starts at zero level and increases in the direction of X merely represents the fact that the filter is a color filter wedge of gradually increasing density or opacity. This migration of the electrons and holes creates both an interface charge pattern $\sigma g$ and a voltage pattern $V_g$ of the original as viewed through a green filter. For a detailed description and graphical illustration of the charge and imagewise exposure and the resulting effect upon the xerographic plate, one may refer to the abovementioned copending application Serial No. 410,725.

Figure 10A:
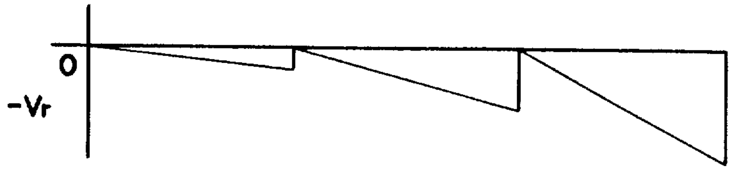
Figure 10B:
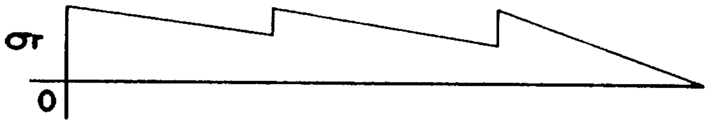
Figure 11:
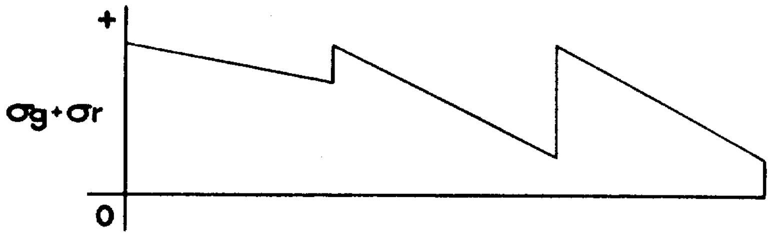

The xerographic plate is again charged negatively and exposed through a red filter. This forms a potential pattern $-V_r$ as shown in FIG. 10A and a pattern of positive charges $+\sigma r$ at the interface between the photoconductive layer and the insulating layer as shown in FIG. 10B. The charge pattern $+\sigma g$ formed by the blue filter exposure as shown in FIG. 11 is added onto the pattern $+\sigma g$.

Figure 12A:
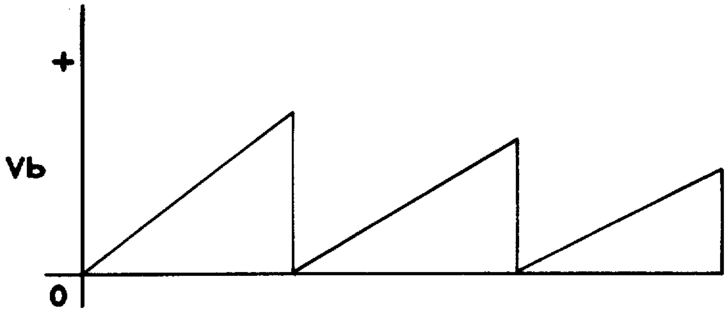
Figure 12B:
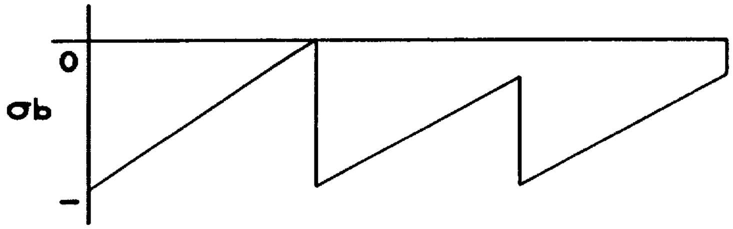

The xerographic plate is then charged positively and exposed through a blue filter. Now note that this time the polarity of the charge is reversed. Consequently, the electrons of the electron-hole pairs generated on exposure migrate to the photoconductor-insulator interface and holes migrate to the conductor and are neutralized. This migration cicates a surface potential $V_b$ as shown in FIG. 12A and forms a negative charge pattern as shown in FIG. 12B in accordance with the density characteristics shown in FIGS. 4A, 5A and 6A.

As a net result after the successive charge and exposure steps through the various filters as described above, a charge pattern as shown in FIG. 13 is formed. More specifically, the negative charge pattern formed upon exposure through blue filter in part neutralizes the positive charge patterns formed upon exposure through green and red filters. This is evident by combining the charge pattern shown in FIG. 12B with that of FIG. 11.

Figure 13:
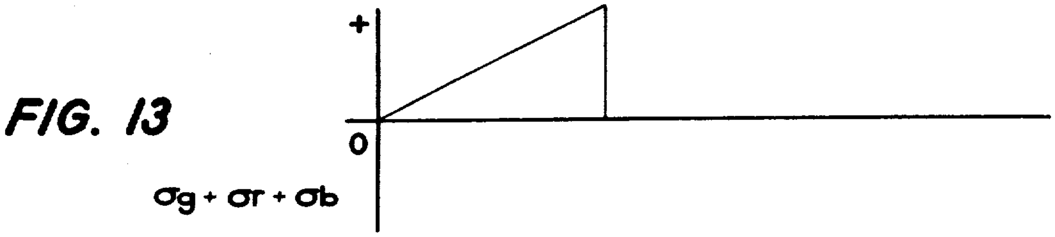

In the process of neutralization, the charge patterns in the magenta and cyan regions are cancelled out and a net positive charge pattern of the yellow areas is formed as shown in FIG. 13.

The plate is then positively recharged to a uniform potential and flood-exposed to relax the electric field. This transforms the charge pattern into a potential or voltage pattern, as described in detail in the abovementioned copending application Ser. No. 410,725. This pattern is then developed with a yellow toner. The yellow toner is transferred to paper and heat fused thereto according to the usual xerographic processes.

Similarly, the reproduction of the magenta area is accomplished by first charging negatively and exposing through a blue filter, and then repeating the charging steps and exposing through a red filter. This is followed by positive charging and exposure through a green filter which yields the electrostatic charge pattern of the magenta areas. Similarly, the cyan color is copied by the steps involving negative charging and exposure through blue and green filters followed by a positive charging and exposure through a red filter.

It is noted, in theory, the charge and imagewise exposure steps with different filters take place in any order and thus, can be interchanged.

The brightness acceptance range and tonal contrast obtained by the method described above can be extended further, if required, by repeating the steps of charges and exposures through each of the different filters with different amounts of exposures in the manner described in detail in my above mentioned copending application. A number of modifications may be made to the basic steps involved in the color correction method described above; for example, the time needed to sensitize the xerographic plate 10 may be reduced by performing the first and second corona charging and exposure steps simultaneously using suitable apparatus such as those disclosed in U.S. Pat. No. 3,307,034 to Bean. As described therein the optimum level of charges and exposures are provided when the distance between the corona electrodes is substantially equal to the distance between the electrodes and the xerographic plate.

The following describes certain specific examples that illustrate the present invention in which the yellow print requires a 20% and 30% negative masks for the unwanted blue absorption of the magenta and cyan colorants. A 25 micron layer of ambipolar photoreceptor, as described in detail in my above-mentioned copending application Ser. No. 410,725 was coated on 5 mil grained layer of aluminum to form a xerographic plate. To this plate a sheet of ¼ mil Mylar was bonded by first softening a thermoplastic glue coated on the Mylar and then pressure contacting it to the photoreceptor layer. The structure is charged negatively to a uniform potential of 200 volts and is imagewise exposed through a green filter such as Kodak Wratten filter No. 58 available from Kodak Company, Inc. This exposure to compensate for the unwanted blue absorption of the magenta colorant to be used in the reproduction, is made at 10 ergs/cm$^2$ in high light (clear) areas. The structure is then recharged to a uniform negative potential of 300 volts and imagewise exposed through a red filter (Kodak wratten filter No. 25). This exposure to compensate for the unwanted blue absorption of the cyan colorant, is made at 5 ergs/cm$^2$ in high light areas. The structure is then charged to a uniform positive potential of 1000 volts and an imagewise exposed through a blue filter (Kodak wratten filter 47B). The exposure which records the blue filter density of the original is 20–40 ergs/cm$^2$. The structure is again charged to a uniform positive potential of 1000 volts and then flood exposed.

The flood exposure, which transforms the surface charge density pattern in to a voltage pattern, is implemented by applying any amounts of light energy in excess of 40 ergs/cm$^2$. The resulting voltage pattern which corresponds to the amount of yellow colorant, is developed by a magnetic brush development system biased positively at 1000 volts with respect to the conductive substrate. The magnetic brush development system which contains yellow toner is used to develop the pattern charge negatively. The resulting yellow print obtained is equivalent to the print that would have been obtained if the print were made using a blue filter positive print with a 20% green filter negative mask and 30% red filter negative mask. For the details of the masking process and its function one may refer to "Principles of Color Reproduction" by J. S. C. Yule, published by John Wiley and Sons, Inc., in 1967.

The particular polarity and the magnitude of the potential applied to charge plate and the amount of exposure indicated above in connection with specific examples are understood to be merely examples only. Anyone of ordinary skill can adjust these parameters to a suitable level to effect necessary correction that has to be made to provide proper compensation for the less than ideal characteristics of the colorants he uses in making color copies.

In many cases additional steps of exposure and development may be used to obtain a high fidelity copy of black color and various shades thereof after the development of the three primary colors. These additional steps add definition of shades to the other three colors and is a conventional practice in the graphic arts. For these steps, color toners, such as a cyan toner made of a cobalt blue or pink pigment mixed with a small quantity of green pigment, and a magenta toner made of a vermillion pink powder described in the U.S. Pat. No. 3,057,720 to Hayford may be used advantageously.

Various other changes and modifications may be made to the steps in extending the brightness acceptance range and tonal contrast described above, as will be apparent to those skilled in the art and as such come within the spirit and scope of the appended claims considered to be embraced by the present invention. Thus, for example, the exposures may be made to a color negative of an original through a pair of different primary color lenses and then the remaining primary color lens in place of the third primary color filters. Also, the present inventive method may be used advantageously to form print masters or separate colors. Thus, more particularly, the present inventive method may be used in making xeroprinting masters, lithographic masters and color separations. Thus, for example, the xerographic plate may be charged and imagewise exposed through suitable filters in a controlled manner to form a charge pattern on the plate as described above. The pattern then may be developed with insulating toners and then transferred to a conductive sheet to form a xeroprinting master. The charge pattern so formed may also be developed with oleophilic toners and transferred to a hydrophilic sheet to form a lithographic master. The pattern may also be developed with toners and transferred to a transparent or opaque sheet to make color separations of an original.

What is claimed is:

1. A method for obtaining a color corrected electrostatic latent image comprising the steps of:

a. providing a xerographic member comprising an electrically insulating layer overlying a photoconductive insulating layer which overlies a conductive substrate;

b. applying a first electrostatic charge to said member;

c. imagewise exposing said member to an original color image through a filter of a first primary color;

d. applying a second electrostatic charge to said member, said second charge having a polarity opposite to that of said first charge;

e. imagewise exposing said member to said original color image through a filter of a second primary color, said second primary color being complementary to the color information of said original image which is represented by the electrostatic latent image being formed;

f. applying a third electrostatic charge to said member; and g. flood exposing said member whereby there is formed a color corrected electrostatic latent image on said member.

2. The method as defined in claim 1 wherein steps (b) and (c) are performed simultaneously.

3. The method as defined in claim 2 wherein steps (d) and (e) are performed simultaneously.

4. The method as defined in claim 1 and further including the step of:

h. developing said electrostatic latent image on said member with a toner having a color which is complementary to that of said second primary color.

5. The method as defined in claim 4 and further including the step of:

i. transferring said developed image to a receiver member.

6. The method as defined in claim 4 and further including performing steps (b)–(h) at least one additional time to form in register on said member at least one additional visible image of another primary color present in said original image.

7. The method as defined in claim 6 and further including the step of:

i. transferring said developed images to a receiver member.

8. The method as defined in claim 7 and further including the step of:

j. fixing said developed image to said receiver member.

9. The method as defined in claim 8 wherein there are formed in register on said member and transferred to said receiver member visible images of the yellow, magenta, and cyan areas, respectively of said original image.

10. The method as defined in claim 1 wherein said imagewise exposures are to a color negative of an original image through primary color lenses in place of said primary color filters.

11. The method as defined in claim 1 and further including the steps of:

h. developing said electrostatic latent image with an oleophilic toner having a color which is complementary to that of said second primary color;

i. transferring said developed image to a hydrophilic receiver member; and j. fixing said developed image to said receiver member.

12. A method for obtaining a color corrected electrostatic latent image comprising the steps of:

a. providing a xerographic member comprising an electrically insulating layer overlying a photoconductive insulating layer which overlies a conductive substrate;

b. applying a first electrostatic charge to said member;

c. imagewise exposing said member to an original color image through a filter of a first primary color;

d. applying a second electrostatic charge to said member, said second charge having a polarity the same at that of said first charge;

e. imagewise exposing said member to said original color image through a filter of a second primary color;

f. applying a third electrostatic charge to said member, said third charge having a polarity which is opposite to that of said first and second charges;

g. imagewise exposing said member to said original color image through a filter of a third prmary color, said third primary color being complementary to the color information of said original image which is represented by the electrostatic latent image being formed;

h. applying a fourth electrostatic charge to said member, and i. flood exposing said member whereby there is formed a color corrected electrostatic latent image on said member.

13. The method as defined in claim 12 wherein steps (b) and (c) are performed simultaneously.

14. The method as defined in claim 13 wherein steps (d) and (e) are performed simultaneously.

15. The method as defined in claim 14 wherein steps (f) and (g) are performed simultaneously.

16. The method as defined in claim 12 and further including the step of:

j. developing said electrostatic latent image on said member with a toner having a color which is complementary to that of said third primary color.

17. The method as defined in claim 16 and further including the step of:

k. transferring said developed image to a receiver member.

18. The method as defined in claim 16 wherein said first primary color filter is green, said second primary color filter is red, said third primary color filter is blue and said toner is yellow.

19. The method as defined in claim 18 and further including forming in register on said member a visible image of the magenta areas of said original image by the steps of:

applying a first electrostatic charge to said member;

imagewise exposing said member to said original image through a red filter;

applying a second electrostatic charge to said member, said second charge having the same polarity as that of said first charge;

imagewise exposing said member to said original image through a blue filter;

applying a third electrostatic charge to said member, said third charge having a polarity opposite to that of said first and second charges;

imagewise exposing said member to said original image through a green filter;

applying a fourth electrostatic charge to said member;

flood exposing said member whereby an electrostatic latent image is formed; and developing said electrostatic latent image with a magenta colored toner.

20. The method as defined in claim 19 and further including forming in register on said member a visible image corresponding to the cyan areas of said original image by the steps of:

applying a first electrostatic charge to said member;

imagewise exposing said member to said original image through a blue filter;

applying a second electrostatic charge to said member, said second charge having the same polarity as that of said first charge;

imagewise exposing said member to said original image through a green filter;

applying a third electrostatic charge to said member, said third charge having a polarity opposite to that of said first and second charges;

imagewise exposing said member to said original image through a red filter;

applying a fourth electrostatic charge to said member;

flood exposing said member whereby an electrostatic latent image is formed; and developing said electrostatic latent image with a cyan colored toner.

21. The method as defined in claim 20 and further including the steps of:

transferring said developed images to a receiver member and fixing said developed image to said receiver member.

22. The method as defined in claim 16 wherein said first primary color filter is red, said second primary color filter is blue, said third primary color filter is green and said toner is magenta.

23. The method as defined in claim 16 wherein said first primary color filter is blue, said second primary color filter is green, said third primary color filter is red and said toner is cyan.

* * * * *